United States Patent
Park et al.

(10) Patent No.: US 8,875,531 B2
(45) Date of Patent: Nov. 4, 2014

(54) FUEL CELL VEHICLE

(75) Inventors: Jeong Kyu Park, Gyeonggi-do (KR);
Hyun Jun Kim, Gyeonggi-do (KR);
Jong Hun Park, Gyeonggi-do (KR);
Chang Hwan Ye, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 699 days.

(21) Appl. No.: 13/153,867

(22) Filed: Jun. 6, 2011

(65) Prior Publication Data

US 2012/0138261 A1 Jun. 7, 2012

(30) Foreign Application Priority Data

Dec. 6, 2010 (KR) .......................... 10-2010-0123149

(51) Int. Cl.

| | | |
|---|---|---|
| *B60H 1/32* | (2006.01) | |
| *B60L 11/18* | (2006.01) | |
| *B60L 1/08* | (2006.01) | |
| *B60L 1/02* | (2006.01) | |
| *B60H 1/00* | (2006.01) | |
| *B60L 1/06* | (2006.01) | |
| *B60L 3/00* | (2006.01) | |
| *B60H 3/00* | (2006.01) | |
| *B60L 1/00* | (2006.01) | |

(52) U.S. Cl.
CPC .......... *B60H 3/0092* (2013.01); *B60L 11/1898* (2013.01); *B60L 1/08* (2013.01); *B60L 2240/36* (2013.01); *B60L 1/02* (2013.01); *B60L 2240/34* (2013.01); *B60H 1/00385* (2013.01); *B60L 1/06* (2013.01); *Y02T 90/34* (2013.01); *B60L 3/0053* (2013.01); *B60L 11/1894* (2013.01); *B60L 1/003* (2013.01)
USPC ............................................... 62/243; 62/276

(58) Field of Classification Search
CPC ........ B60H 1/3232; B60H 1/32; F25D 21/08; F25D 17/065; F25B 2600/01
USPC .......... 62/243, 244, 276, 157, 187; 165/43, 42
See application file for complete search history.

(56) References Cited

U.S. PATENT DOCUMENTS

2003/0010487 A1* 1/2003 Ieda et al. ..................... 165/202
2004/0200610 A1* 10/2004 Hara ............................. 165/202

(Continued)

FOREIGN PATENT DOCUMENTS

| JP | 2002283836 A | 10/2002 |
|---|---|---|
| JP | 2003127648 A | 5/2003 |

(Continued)

*Primary Examiner* — Mohammad M Ali
(74) *Attorney, Agent, or Firm* — Edwards Wildman Palmer LLP; Peter F. Corless

(57) ABSTRACT

The present invention provides a fuel cell vehicle, particularly a fuel cell vehicle equipped with a moisture remover that removes moisture from an air conditioner evaporator. The fuel cell vehicle includes: a fuel cell stack as a power supplier; an electric heater operated by power from the fuel cell stack; a blower fan for providing air to the electric heater; an air channel configured to supply the air passing through the electric heater to an air conditioner evaporator; and a controller for controlling the operations of the electric heater and the blower fan, whereby moisture is removed from the air conditioner evaporator by supplying air heated by the electric heater to the air conditioner evaporator. The fuel cell vehicle effectively removes moisture from an air conditioner evaporator, solves the problem of a bad smell in the related art, and further removes the oxygen and the stack voltage which remain in the cathode, such that it is possible to avoid cathode oxygen depletion of the related art.

13 Claims, 4 Drawing Sheets

(56) References Cited

U.S. PATENT DOCUMENTS

| | | | |
|---|---|---|---|
| 2004/0216469 A1* | 11/2004 | Viegas et al. | 62/50.2 |
| 2005/0028547 A1* | 2/2005 | Hatakeyama | 62/324.1 |
| 2005/0178523 A1* | 8/2005 | Itoh et al. | 165/42 |
| 2007/0298705 A1* | 12/2007 | Yoshida | 454/254 |
| 2008/0152976 A1* | 6/2008 | Uehara et al. | 429/26 |
| 2008/0245503 A1* | 10/2008 | Wilson et al. | 165/42 |
| 2008/0268305 A1* | 10/2008 | Son | 429/19 |
| 2009/0260377 A1* | 10/2009 | Miller et al. | 62/159 |

FOREIGN PATENT DOCUMENTS

| | | |
|---|---|---|
| JP | 2004345426 A | 12/2004 |
| KR | 10-2002-0001993 A | 1/2002 |
| KR | 10-2005-0038484 A | 4/2005 |
| KR | 10-2008-0010646 | 1/2008 |
| KR | 10-2009-0007008 | 1/2009 |
| KR | 10-2009-0114634 A | 11/2009 |

* cited by examiner

FUEL CELL VEHICLE

CROSS-REFERENCE TO RELATED APPLICATION

This application claims under 35 U.S.C. §119(a) the benefit of Korean Patent Application No. 10-2010-0123149 filed Dec. 6, 2010, the entire contents of which are incorporated herein by reference.

BACKGROUND (a) Technical Field

The present invention relates to a fuel cell vehicle. More particularly, it relates to a fuel cell vehicle equipped with a moisture remover that can remove moisture from an air conditioner evaporator.

(b) Background Art

A fuel cell is a type of electric generator which directly converts chemical energy of fuel into electric energy.

PEMFCs (Polymer Electrolyte Membrane Fuel Cell) are fuel cells that demonstrate high efficiency, large current density and output density, short start time, and rapid response to a change against a load, and, thus, are widely used for vehicles.

In order to use a fuel cell for the power unit of a vehicle, a stack is formed by stacking unit cells of fuel cells to achieve desired power. Various operation devices are then added to form the power unit, and the unit is mounted in the vehicle.

The operation devices of the fuel cell include a hydrogen supply device, an air supply device, and a heat and water management system. The hydrogen supply device supplies hydrogen as fuel to the stack. The air supply device supplies air containing oxygen as an oxidizer to the stack. The heat and water management system optimally manages the operation temperature of the stack by externally discharging heat, which is a byproduct of electrochemical reaction in the stack, and manages water.

The hydrogen supply device includes a hydrogen tank, a hydrogen supply valve, a compressor adjuster, and a hydrogen recirculator (recirculating blower and ejector). The air supplier includes an air supplier (air blower), an air valve, and a humidifier. The heat and water management system includes a cooling water pump, a radiator, a 3-way valve, and a water discharger for discharging water from the stack.

Further, a hydrogen purge valve is provided in a hydrogen exhaust line for removing impurities from an anode, and a cathode oxygen depletion is provided for removing stack voltage.

The cathode oxygen depletion is described in more detail as follows. When a fuel cell vehicle is stopped and the system is shutdown by Key-off/IG-off, hydrogen and oxygen are exchanged through the electrolyte membrane and deterioration of the catalyst layer is accelerated. Further, when the stack voltage is higher than the predetermined voltage, hydrogen and oxygen remain at the anode and the cathode, respectively.

Therefore, when shutting down the system, it is essential to reduce the stack voltage so as to remove the hydrogen and oxygen from the anode and the cathode. One conventional method is to reduce the stack voltage while reducing the oxygen remaining in the cathode by connecting a COD (Cathode Oxygen Depletion) to the stack.

The COD removes the oxygen and voltage remaining in the cathode of the stack by reacting the oxygen remaining in the stack with the hydrogen for each shutdown, thereby discharging the electricity into heat Similar to conventional engine vehicles, a fuel cell vehicle is equipped with an air-conditioning system to control the interior temperature. Unlike conventional engine vehicles which use hot cooling water of the engine to heat the vehicle interior, fuel cells use an electric heater to heat the interior. A PTC (Positive Temperature Coefficient) heater is commonly used as the electric heater.

A fuel cell vehicle is further equipped with a liquid coolant type of air conditioner, which comprises an evaporator, a compressor, a condenser, and a throttle valve, similar to conventional engine vehicles. However, unlike conventional engine vehicles, fuel cell vehicles cannot utilize driving force from the engine to operate a compressor. Instead, an electric compressor using torque of a motor is used.

However, during operation of the air conditioner, a large amount of water condenses on the core surface of the evaporator. Further, even when the air conditioner is turned off, water condenses from the cold air on or around the core surface of the evaporator, which is in contacts with the external hot air. Therefore, although water is discharged through a drain hose of an air-conditioning duct, water that condenses on the core of the evaporator is not completely discharged through the drain hose and, thus, remains therein. As a result, when external dust and pollen enters the interior while water remains in the evaporator, molds form and proliferate, which results in the generation of a bad and unpleasant odor during the early operation of an air conditioner.

FIG. 1 shows an example of the configuration of an air-conditioning system provided in a common fuel cell vehicle. As shown, the system includes which an air-conditioning heater (PTC heater) 30, a blower fan 31, an air-conditioning duct 33, an air conditioner (evaporator) 51, a compressor 52, a condenser 53, a throttle valve 54, a stack 10 that is the main power supplier of the fuel cell vehicle, and a COD 20 that removes oxygen remaining in the cathode of the stack 10 in shutdown.

Looking to FIG. 1, when a switch 32 is turned on, the electric heater 30 is operated by power from the stack 10. As external air or internal air pass through the electric heater 30 by means of the blower fan 31, it becomes heated. The heated air is then supplied to the inside of the vehicle through the air-conditioning duct 33.

Further, when the fuel cell system is shut down, the COD 20 is connected to the stack 10 by turning on the switch 21, such that oxygen in the cathode of the stack and the remaining voltage are removed.

However, the electric heater 30 of the fuel cell vehicle is used only as a heater for heating the interior, such as in the winter, and the air conditioner evaporator 51 is not equipped with any device for removing moisture.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention relates to a fuel cell vehicle equipped with a moisture remover that can remove moisture from an air conditioner evaporator.

The present invention provides a fuel cell vehicle including: a fuel cell stack as a power supplier; an electric heater operated by power from the fuel cell stack; a blower fan for sucking air into the electric heater; an air channel for allowing the air passing through the electric heater to be supplied to an air conditioner evaporator; and a controller for controlling the operations of the electric heater and the blower fan, in order to remove moisture from the air conditioner evaporator, particularly by supplying air heated by the electric heater to the air conditioner evaporator.

In a preferred embodiment, the controller is set to operate the electric heater by using power from the fuel cell stack, wherein when a fuel cell system is shut down, the electric heater removes oxygen remaining in a cathode and removes moisture from the air conditioner evaporator.

In another preferred embodiment, an electric heater and a blower fan configured for heating an interior are disposed in an air-conditioning duct connected to the interior of the vehicle. An air channel, which is a diverging channel that diverges from an air-conditioning duct and extends to the air conditioner evaporator, is further provided. The fuel cell vehicle further includes an opening/closing device that is disposed to selectively open/close the diverging channel, and which opens the diverging channel in response to a control signal from the controller to remove moisture.

In still another preferred embodiment, the opening/closing device for opening/closing the air channel is a damper door device that switches an air flow passage between the diverging channel and the air-conditioning duct connected to the interior of the vehicle.

In yet another preferred embodiment, an electric heater and a blower fan configured for heating the interior are disposed in an air-conditioning duct connected to the interior of the vehicle. An air channel extends from the interior of the vehicle to the air conditioner evaporator. The fuel cell vehicle further comprises a blower fan for an evaporator that is controlled by the controller, and which blows interior air heated by the electric heater to heat the air conditioner evaporator.

In another aspect, the present invention provides a fuel cell vehicle including: a fuel cell stack as a power supplier; an electric heater attached to an air conditioner evaporator and operated by power from the fuel cell stack; and a controller for controlling operation of the electric heater, whereby the electric heater is operated by power from the fuel cell stack to heat the air conditioner evaporator and to remove moisture.

In a preferred embodiment, the controller is configured to operate the electric heater, which uses power from the fuel cell stack. In particular, when a fuel cell system is shut down, the electric heater is operated to remove oxygen remaining in a cathode and removes moisture from the air conditioner evaporator.

Therefore, according to an embodiment of the present invention, the electric heater and blower fan operate to supply hot dry air, that is heated by the electric heater, to the air conditioner evaporator through the diverging channel. It is, thus, possible to effectively remove moisture from the air conditioner evaporator and solve the problem of bad odor in the related art.

In particular, by using the electric heater as a cathode oxygen depletion, stack power is consumed in the process of removing moisture during fuel cell system shut down. Thus, it is possible to remove moisture from the evaporator and oxygen remaining in the cathode (remove stack voltage) during shutdown, such that it is possible to remove the COD.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The above and other features of the invention are discussed infra.

BRIEF DESCRIPTION OF THE DRAWINGS

The above and other features of the present invention will now be described in detail with reference to certain exemplary embodiments thereof illustrated the accompanying drawings which are given hereinafter by way of illustration only, and thus are not limitative of the present invention, and wherein.

Figure 1:
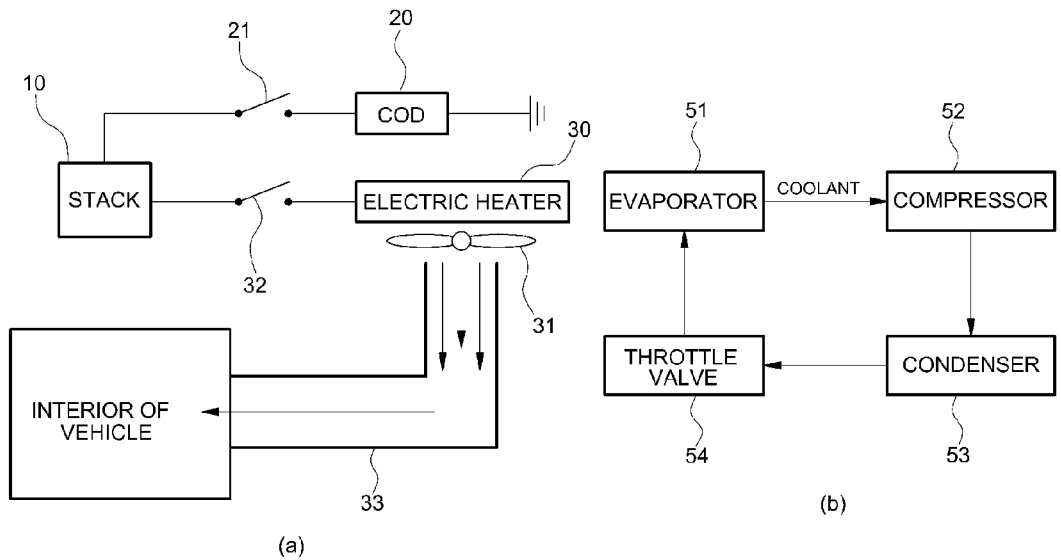
FIG. 1 is a diagram showing the configuration of an air-conditioning system that is used for a common fuel cell vehicle.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Hereinafter, preferred embodiments of the present invention will be described in detail with reference to the accompanying drawings so that they can be easily carried out by those skilled in the art.

Figure 2:
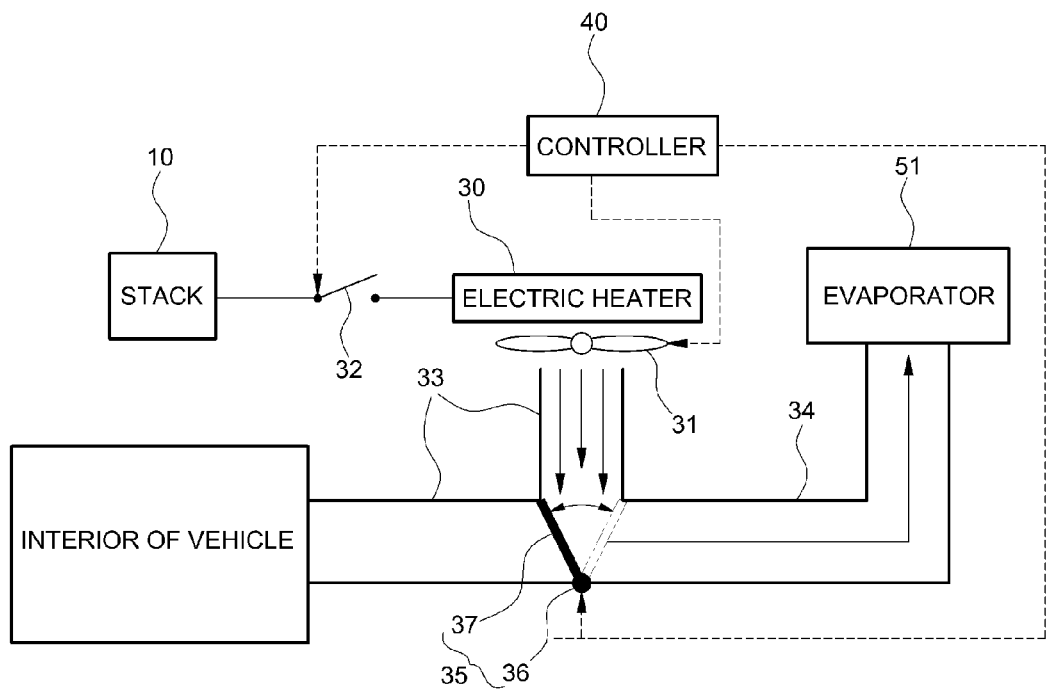
FIG. 2 is a diagram when an air-conditioning moisture remover is provided in a fuel cell vehicle according to an embodiment of the present invention.

FIG. 2 is a diagram illustrating an air-conditioning moisture remover provided in a fuel cell vehicle according to an embodiment of the present invention.

In this embodiment, a fuel cell vehicle is equipped with a moisture remover that removes moisture from an air conditioner evaporator 51. As shown, using power from the stack 10, an electric heater 30 supplies air with increased temperature to the evaporator 51 such that moisture is removed. In particular, in order to consume stack power and remove oxygen remaining in a cathode when a fuel cell system is shut down, the electric heater 30 is connected to the stack 10 in shutdown.

According to conventional systems, the voltage of the stack remains at 400V or higher in Key-off and a COD is connected to the fuel cell stack 10 to remove the remaining voltage. However, according to the present invention, instead of using the COD, the electric heater 30 mounted in the vehicle to heat the interior is used as a load for removing the remaining voltage in shutdown. In other words, according to the present invention, the electric heater 30 that is mainly used to heat the interior when needed (e.g. in winter), is connected to the fuel cell stack 10 to be used as a load that consumes the stack power and removes the oxygen in the cathode.

Therefore, as shown in FIG. 2, an evaporator moisture remover in a fuel cell vehicle according to the present invention includes a fuel cell stack 10 which functions as a power supplier, an electric heater 30 operated by power from the fuel cell stack 10, a blower fan 31 for providing air to the electric heater 30, an air channel 34 for supplying the air passing through the electric heater 30 to the air conditioner evaporator 51, and a controller 40 for controlling the electric heater 30 and the blower fan 31.

In this configuration, the electric heater 30 can be any type of electric heater and may, for example, be a PTC heater that is commonly used as a heater for heating the interior of a fuel cell vehicle.

As further shown in FIG. 2, a heater switch 32 can be disposed between the fuel cell stack 10 and the electric heater 30 such that the stack power may be selectively applied to the electric heater 30. For example, the heater switch 32 may be a relay that is opened/closed by an electric signal from the controller 50.

As further shown, the heater 30 and the blower fan 31 can be disposed in the air-conditioning duct 33 connected to the interior of the vehicle to heat the interior of the fuel cell vehicle, in which the air channel 34 is a diverging channel that diverges from the air-conditioning duct 33 and extends to the air conditioner evaporator 51.

The electric heater 30 and the blower fan 31 operate such that air heated by the electric heater 30 is supplied to the interior of the vehicle through the air-conditioning duct 33, in order to heat the interior. When the heated air does not need to heat the interior (such as in shutdown), it can be supplied to the evaporator 51 through the diverging channel 34, thereby removing moisture.

As shown in this embodiment, an opening/closing unit 35 that selectively opens/closes the air-conditioning duct 33 connected to the interior of the vehicle and the diverging channel 34 is provided. For example, as shown, the opening/closing unit 35 may be disposed at the diverging point where the diverging channel 34 diverges.

The opening/closing unit 35 may be, for example, a damper door device that switches the air flow passage between the diverging channel 34 and the air-conditioning duct 33 connected to the interior of the vehicle, such as in response to a control signal from the controller 40.

The damper door device 35 can be configured such that an actuator 36 operates in response to a control signal from the controller 40 to rotate a damper door 37. As such, the air flow passage is switched in accordance with the positions of the damper door 37, which is determined by the actuator 36.

A process of removing moisture from the air conditioner evaporator by means of the air-conditioning moisture remover in a fuel cell vehicle according to an embodiment of the present invention is described below.

First, as the opening/closing device 35 operates in response to a control signal from the controller 40, the air-conditioning duct 33 is opened to heat the interior, while the diverging channel 34 is opened to shut down the fuel cell system. In other words, the opening/closing device 35 closes the diverging channel 34 and opens the air-conditioning duct 33 to heat the interior (e.g. in winter). As shown, when the heater switch 32 is turned on, the electric heater 30 is in connection with the stack 10, such that the electric heater 30 is operated by the stack power.

Further, the controller 40 operates the blower fan 31, such that the air heated by the electric heater 30 is supplied to the interior of the vehicle through the air-conditioning duct 33, thereby heating the interior.

Figure 3:
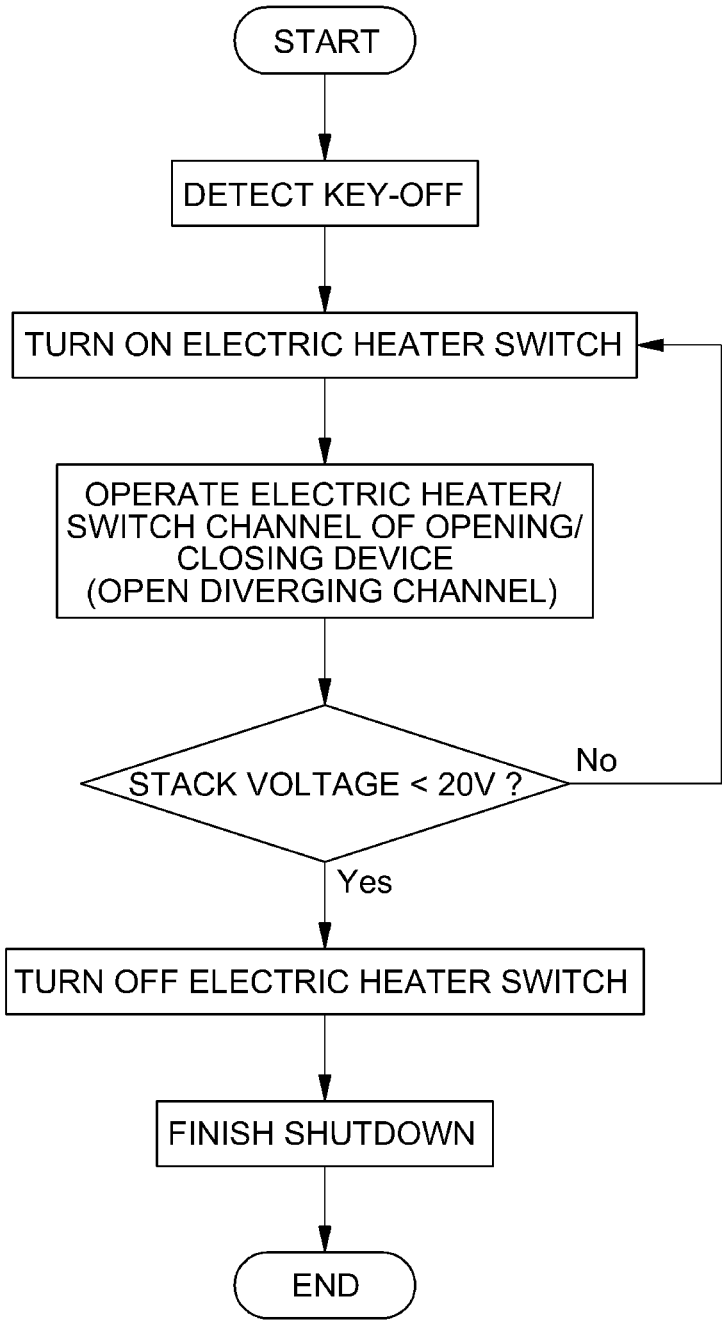
FIG. 3 is a flowchart illustrating a process of removing moisture which is performed by the air-conditioning moisture remover in a fuel cell vehicle according to an embodiment of the present invention.

When the driver stops the vehicle and turns the key to the OFF-position, common shutdown of the fuel cell system is performed, in which moisture is removed from the evaporator by using the remaining voltage in the stack, as described below with respect to FIG. 3.

As the controller 40 detects a key-off signal, the process of removing moisture is performed. First, when the key-off signal is detected, the heater switch 32 is turned on such that the electric heater 30 is connected to the fuel cell stack 10 and the electric heater 30 is operated.

The diverging channel 34 is opened and the air-conditioning duct 33 is closed by controlling the opening/closing unit 35, together with the operation of the electric heater 30 by means of the stack power, and operation of the blower fan 31.

As a result, the air provided by the blower fan 31 is heated by the electric heater 30 and is supplied to the diverging channel 34, and the hot dry air heated by the electric heater 30 is supplied to the evaporator 51 through the diverging channel 34, such that moisture can be removed.

In the process of removing moisture from the evaporator 51, as the electric heater 30 consumes the stack power, the oxygen remaining in the cathode is removed, such that the electric heater 30 functions as the COD of the related art.

When the oxygen has been removed from the cathode and the moisture has been removed from the evaporator 51, the stack voltage (e.g. as detected by a voltage detector) drops below a predetermined voltage (e.g., 20V). In response, the controller 40 stops the operation of the electric heater 30 by turning off the heater switch 32, and also stops the operation of the blower fan 31.

According to the described configuration and operation of the air-conditioning moisture remover in a fuel cell vehicle, the process of removing moisture and oxygen can always be performed in shutdown, regardless of whether the air conditioner operates while the vehicle is in use.

Further, according to the present invention, the actuator 36 and the blower fan 41 of the opening/closing device 35 may be operated by the stack power or by power from an individual battery in the vehicle.

Figure 4:
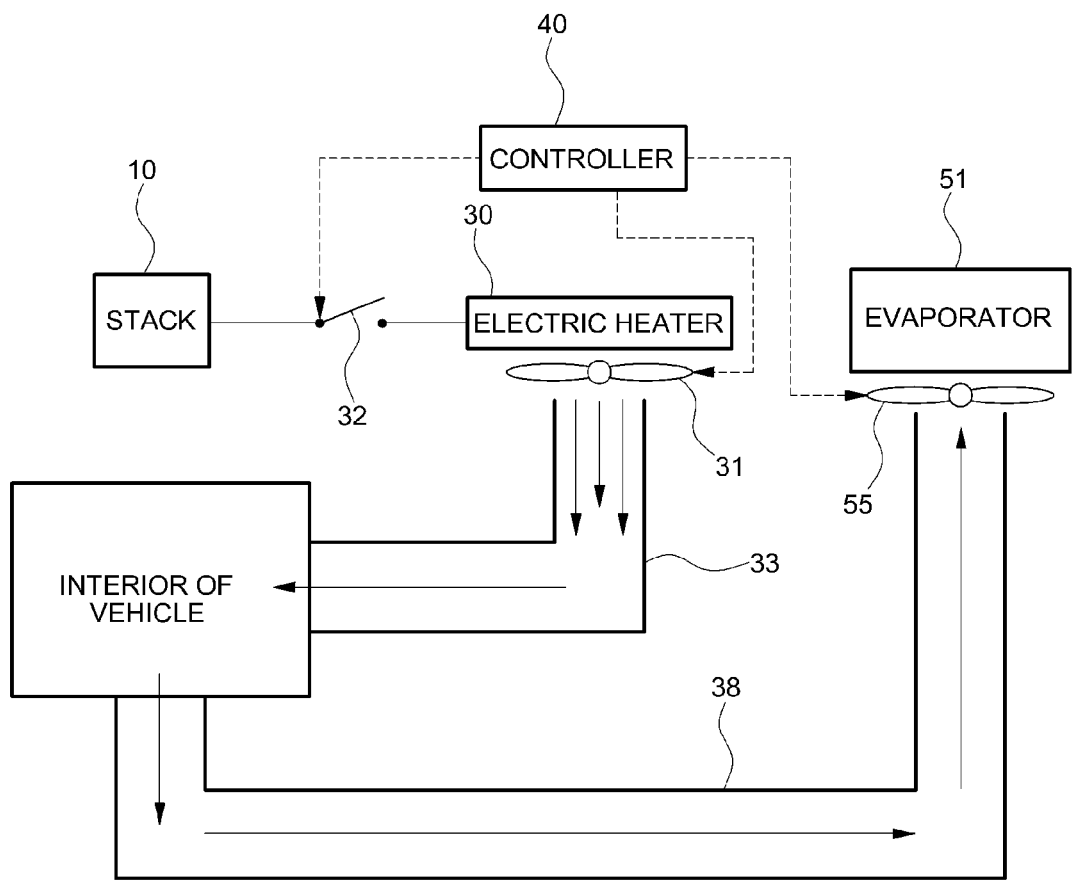
FIG. 4 is a diagram illustrating an air-conditioning moisture remover provided in a fuel cell vehicle according to another embodiment of the present invention.

Meanwhile, FIG. 4 shows a diagram in accordance with another embodiment of the present invention.

In particular, according to the embodiment shown in FIG. 2, air heated by the electric heater 30 is provided to the air conditioner evaporator 51 through an the air channel diverging from the air-conditioning duct, that is, the diverging channel 34. According to the embodiment shown in FIG. 4, air heated by the electric heater (e.g., PTC heater) 30 is first supplied to the interior, and is subsequently supplied to the air conditioner evaporator 51 through an air channel 38. For example, as shown, the air channel 38 extends to the air conditioner evaporator 51 from the interior of the vehicle.

In this case, for example, the air that has circulated in the interior of the vehicle may then be supplied to the air conditioner evaporator 51 through an air-conditioner filter, which is not shown.

Further, in this embodiment, a blower fan 55 can be further disposed near the air conditioner evaporator 51 such that the interior air (i.e. the air heated by the electric heater that has been supplied to the interior) is sucked through the air channel 38 and supplied to the air conditioner evaporator 51 by the blower fan 55.

For this configuration, the controller 40 can be configured to operate the blower fan 55 for the evaporator 51, together with the blower fan 31 for the electric heater 30, such as in shutting down the fuel cell system.

In this embodiment shown in FIG. 4, since the hot dry air that has been heated by the electric heater 30 is supplied first to the interior and also to the air conditioner evaporator 51 through the air channel 38, it is possible to effectively remove moisture from the air conditioner evaporator 51.

The embodiment shown in FIG. 4 is the same or similar to the operational process, state and effect as that of FIG. 2, except that the air channel is not a diverging channel that diverges from the air-conditioning duct, but rather is an air channel 38 connected between the interior of the vehicle and the air conditioner evaporator 51 via a blower fan 55.

Figure 5:
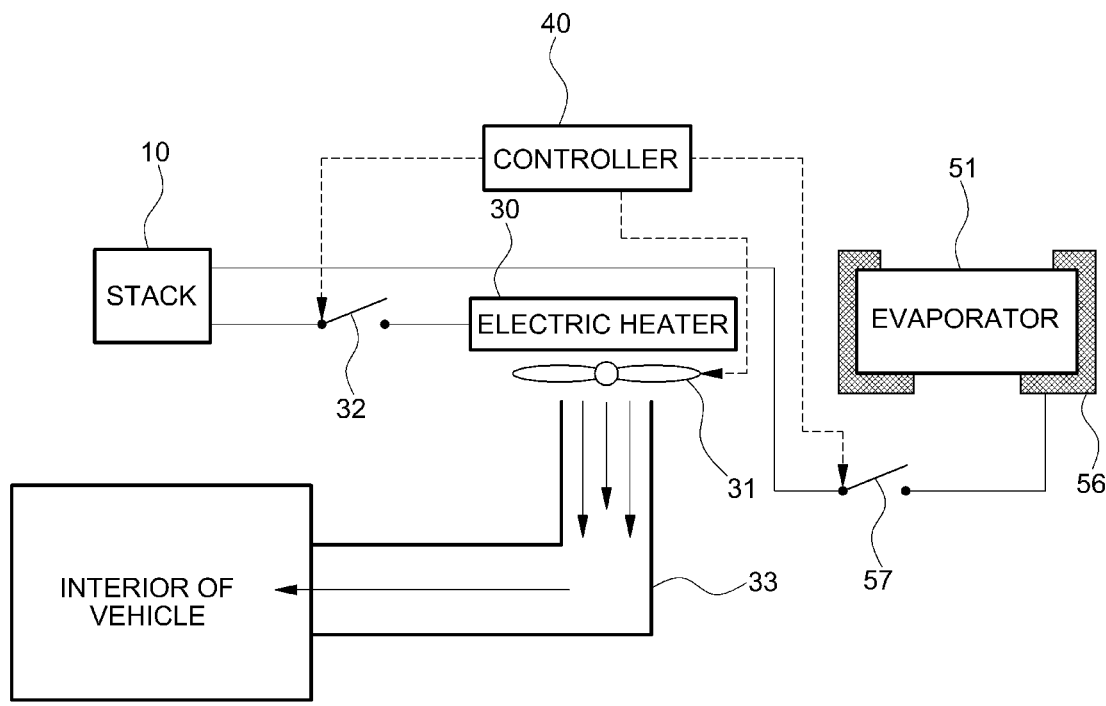
FIG. 5 is a diagram illustrating an air-con moisture remover provided in a fuel cell vehicle according to another embodiment of the present invention.

FIG. 5 is a diagram illustrating another embodiment of air-conditioning moisture remover of the present invention, in which an electric heater (e.g., PTC heater) 56 is directly attached to the air conditioner evaporator 51.

In particular, the air conditioner evaporator 51 is directly heated by operating the electric heater 56 attached thereto such that moisture can be removed.

In this configuration, the electric heater 56 attached to the air conditioner evaporator 51 is a heater separate from the electric heater 30 which is configured for heating the interior. The electric heater 56 can be configured such that it is turned on/off by a switch 57.

Thus, for example, the electric heater 30 in the embodiments of FIGS. 2 and 4 is configured for both heating the interior of the vehicle and for heating the air for removing moisture from the evaporator while consuming the stack power (removing the oxygen remaining in the cathode) in shutting down the fuel cell system. On the other hand, in the embodiment shown in FIG. 5, the electric heater 56 attached to the air conditioner evaporator 51 directly heats the air conditioner evaporator 51 by means of the stack power to remove the moisture and remove the remaining oxygen and voltage of the stack in shutting down the fuel cell system.

According to the embodiment shown in FIG. 5, also referred to as the direct-heating type, a specific air channel and a blower fan are not required.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A fuel cell vehicle comprising:
a fuel cell stack as a power supplier;
an electric heater operated by power from the fuel cell stack;
a blower fan configured for providing air to the electric heater;
an air channel configured to pass air heated by the electric heater to an air conditioner evaporator; and
a controller configured for controlling the operations of the electric heater and the blower fan,
whereby moisture is removed from the air conditioner evaporator by supplying the air heated by the electric heater to the air conditioner evaporator,
wherein the electric heater and the blower fan are disposed in connection with an air-conditioning duct connected to the interior of the vehicle for heating the interior of the vehicle,
wherein the air channel is a diverging channel that diverges from the air-conditioning duct and extends to the air conditioner evaporator, and
the fuel cell vehicle further comprises an opening/closing device disposed to selectively open/close the diverging channel, whereby the opening/closing device is configured to open the diverging channel in response to a control signal from the controller to remove moisture.

2. The fuel cell vehicle of claim 1, wherein the controller is configured to operate the electric heater, using the power from the fuel cell stack in shutting down a fuel cell system, such that oxygen and voltage remaining in a cathode of the stack is removed and moisture is removed from the air conditioner evaporator, by the electric heater.

3. The fuel cell vehicle of claim 1, wherein the opening/closing device for opening/closing the air channel is a damper door device that switches the air flow passage between the diverging channel and the air-conditioning duct.

4. The fuel cell vehicle of claim 1, wherein the electric heater and the blower fan are configured for heating the interior of the vehicle, and are disposed in connection with an air-conditioning duct connected to the interior of the vehicle, wherein the air channel extends from the interior of the vehicle to the air conditioner evaporator, and
the fuel cell vehicle further comprises a second blower fan controlled by the controller and configured to provide heated air from the interior of the vehicle to the air conditioner evaporator.

5. A fuel cell vehicle comprising:
a fuel cell stack as a power supplier;
an electric heater attached to an air conditioner evaporator, the electric heater being operated by power from the fuel cell stack; and
a controller configured for controlling operation of the electric heater,
wherein the electric heater is operated by power from the fuel cell stack to heat the air conditioner evaporator and remove moisture,
wherein the electric heater and the blower fan are disposed in connection with an air-conditioning duct connected to the interior of the vehicle for heating the interior of the vehicle,
wherein the air channel is a diverging channel that diverges from the air-conditioning duct and extends to the air conditioner evaporator, and
the fuel cell vehicle further comprises an opening/closing device disposed to selectively open/close the diverging channel, whereby the opening/closing device is configured to open the diverging channel in response to a control signal from the controller to remove moisture.

6. The fuel cell vehicle of claim 5, wherein the controller is configured to operate the electric heater using power from the fuel cell stack in shutting down a fuel cell system, such that oxygen and voltage remaining in a cathode of the stack are removed and moisture is removed from the air conditioner evaporator by the electric heater.

7. A moisture removal system for an air-conditioner evaporator of a fuel cell vehicle comprising:

an electric heater operated by power from a fuel cell stack of the vehicle;
a blower fan configured for providing air to the electric heater;
an air channel configured to pass air heated by the electric heater to the air conditioner evaporator; and
a controller configured for controlling the operations of the electric heater and the blower fan,
whereby moisture is removed from the air conditioner evaporator by supplying the air heated by the electric heater to the air conditioner evaporator,
wherein the electric heater and the blower fan are disposed in connection with an air-conditioning duct connected to the interior of the vehicle for heating the interior of the vehicle,
wherein the air channel is a diverging channel that diverges from the air-conditioning duct and extends to the air conditioner evaporator, and
the fuel cell vehicle further comprises an opening/closing device disposed to selectively open/close the diverging channel, whereby the opening/closing device is configured to open the diverging channel in response to a control signal from the controller to remove moisture.

8. The moisture removal system of claim 7, wherein the controller is configured to operate the electric heater, using the power from the fuel cell stack in shutting down a fuel cell system, such that oxygen and voltage remaining in a cathode of the stack is removed and moisture is removed from the air conditioner evaporator, by the electric heater.

9. The moisture removal system of claim 7, wherein the electric heater and the blower fan are disposed in connection with an air-conditioning duct connected to an interior of the vehicle for heating the interior of the vehicle,
wherein the air channel is a diverging channel that diverges from the air-conditioning duct and extends to the air conditioner evaporator, and
the fuel cell vehicle further comprises an opening/closing device disposed to selectively open/close the diverging channel, whereby the opening/closing device is configured to open the diverging channel in response to a control signal from the controller to remove moisture.

10. The moisture removal system of claim 9, wherein the opening/closing device for opening/closing the air channel is a damper door device that switches the air flow passage between the diverging channel and the air-conditioning duct.

11. The moisture removal system of claim 7, wherein the electric heater and the blower fan are configured for heating an interior of the vehicle, and are disposed in connection with an air-conditioning duct connected to the interior of the vehicle, wherein the air channel extends from the interior of the vehicle to the air conditioner evaporator, and the fuel cell vehicle further comprises a second blower fan controlled by the controller and configured to provide heated air from the interior of the vehicle to the air conditioner evaporator.

12. A moisture removal system for an air-conditioner evaporator of a fuel cell vehicle comprising:
an electric heater attached to the air conditioner evaporator, the electric heater being operated by power from a fuel cell stack of the vehicle; and
a controller configured for controlling operation of the electric heater,
wherein the electric heater is operated by power from the fuel cell stack to heat the air conditioner evaporator and remove moisture,
wherein the electric heater and the blower fan are disposed in connection with an air-conditioning duct connected to the interior of the vehicle for heating the interior of the vehicle,
wherein the air channel is a diverging channel that diverges from the air-conditioning duct and extends to the air conditioner evaporator, and
the fuel cell vehicle further comprises an opening/closing device disposed to selectively open/close the diverging channel, whereby the opening/closing device is configured to open the diverging channel in response to a control signal from the controller to remove moisture.

13. A fuel cell vehicle comprising:
a fuel cell stack as a power supplier;
an electric heater operated by power from the fuel cell stack;
a blower fan configured for providing air to the electric heater;
an air channel configured to pass air heated by the electric heater to an air conditioner evaporator; and
a controller configured for controlling the operations of the electric heater and the blower fan,
whereby moisture is removed from the air conditioner evaporator by supplying the air heated by the electric heater to the air conditioner evaporator,
wherein the electric heater and the blower fan are configured for heating the interior of the vehicle, and are disposed in connection with an air-conditioning duct connected to the interior of the vehicle, wherein the air channel extends from the interior of the vehicle to the air conditioner evaporator, and
the fuel cell vehicle further comprises a second blower fan controlled by the controller and configured to provide heated air from the interior of the vehicle to the air conditioner evaporator.

* * * * *